US012579170B2

(12) United States Patent
Sanghai et al.

(10) Patent No.: US 12,579,170 B2
(45) Date of Patent: Mar. 17, 2026

(54) AUTOMATIC ORGANIZATION OF USER ACTIVITY INTO COLLECTIONS BASED ON TOPICS

(71) Applicant: MICROSOFT TECHNOLOGY LICENSING, LLC, Redmond, WA (US)

(72) Inventors: Nidhi Shekhar Sanghai, Newcastle, WA (US); Justin Layne Nordin, Redmond, WA (US); Kyle Thomas Kral, Redmond, WA (US); Nathan Peter Pollock, Woodinville, WA (US); Anjali Sujal Parikh, Redmond, WA (US); Wei Wei, Sammamish, WA (US); Yanji Cong, Bellevue, WA (US); Xiaoli Liu, Sammamish, WA (US); Jens Erik Jorgenson, Wheaton, IL (US); Ryan Sung Jun Bae, Seattle, WA (US); Steve Ku Lim, Redmond, WA (US); Hammad Hassan, Seattle, WA (US); Marisa Aida Cantu, Maple Valley, WA (US); Sranee Sri Bayapureddy, Seattle, WA (US); Yohann Puri, Seattle, WA (US); John Joseph Buglione, III, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/669,315

(22) Filed: May 20, 2024

(65) Prior Publication Data

US 2025/0355902 A1      Nov. 20, 2025

(51) Int. Cl.
| | |
|---|---|
| *G06F 16/00* | (2019.01) |
| *G06F 16/28* | (2019.01) |
| *G06F 40/279* | (2020.01) |

(52) U.S. Cl.
CPC .......... *G06F 16/287* (2019.01); *G06F 40/279* (2020.01)

(58) Field of Classification Search
CPC ........................... G06F 16/287; G06F 40/279
See application file for complete search history.

(56) References Cited

U.S. PATENT DOCUMENTS

| | | | | |
|---|---|---|---|---|
| 10,437,905 | B2 * | 10/2019 | Berzins ............... | G06F 16/9562 |
| 2015/0106760 | A1 * | 4/2015 | Axelsson ............. | G06F 3/0481 |
| | | | | 715/781 |

(Continued)

*Primary Examiner* — Alexander Khong
(74) *Attorney, Agent, or Firm* — Newport IP, LLC; Jacob P. Rohwer

(57)      ABSTRACT

The techniques disclosed herein provide a system for automatically organizing content captures of user activity into collections based on a shared topic. Due to the significant portion of daily life that occurs via personal computing devices, there is increasing need for helpful user experiences to enhance productivity and engagement. Namely, those directed to assisting a user in managing and recalling their past activity. As such, the presented system retrieves content captures depicting a moment of interest. Accordingly, the system performs a visual analysis of each content capture to determine a semantic context and assign one or more topics. This is accomplished by utilizing a pair of machine learning models to identify and extract relevant text information. The extracted text information is then analyzed by a topic classification model to assign the one or more topics. The system further includes graphical user interfaces for viewing and managing collections of content captures.

20 Claims, 8 Drawing Sheets

(56)                    References Cited

U.S. PATENT DOCUMENTS

| | | | | |
|---|---|---|---|---|
| 2015/0220257 | A1* | 8/2015 | Moore | G06F 3/03 |
| | | | | 715/765 |
| 2017/0339246 | A1* | 11/2017 | Gu | H04W 4/18 |
| 2018/0357207 | A1* | 12/2018 | Yi | G06F 40/131 |
| 2021/0375023 | A1* | 12/2021 | Kothari | G06N 3/044 |
| 2022/0158961 | A1* | 5/2022 | Stamatiou | H04L 51/222 |
| 2023/0039684 | A1* | 2/2023 | Vincent | G06F 16/44 |
| 2023/0088720 | A1* | 3/2023 | Wang | G06F 3/0481 |
| | | | | 726/26 |
| 2024/0160343 | A1* | 5/2024 | Anvaripour | G06F 3/0488 |
| 2024/0163489 | A1* | 5/2024 | Anvaripour | G06T 19/006 |

* cited by examiner

500

RETRIEVE PLURALITY OF CONTENT CAPTURES OF DESKTOP ENVIRONMENT, WHEREIN AN INDIVIDUAL CONTENT CAPTURE INCLUDES A PLURALITY OF TEXT REGIONS DEFINING A SEMANTIC CONTEXT
502

DETECT, FOR EACH INDIVIDUAL CONTENT CAPTURE, THE PLURALITY OF TEXT REGIONS IN THE INDIVIDUAL CONTENT CAPTURE
504

IDENTIFY, FOR EACH INDIVIDUAL CONTENT CAPTURE, A SUBSET OF THE PLURALITY OF TEXT REGIONS CONTAINING RELEVANT TEXT INFORMATION
506

DETERMINE, FOR EACH INDIVIDUAL CONTENT CAPTURE, ONE OR MORE TOPICS BASED ON A TEXTUAL ANALYSIS OF THE SUBSET OF TEXT REGIONS CONTAINING RELEVANT TEXT INFORMATION
508

ASSIGNING THE ONE OR MORE TOPICS TO THE EACH OF THE PLURALITY OF CONTENT CAPTURES
510

FIG. 5A

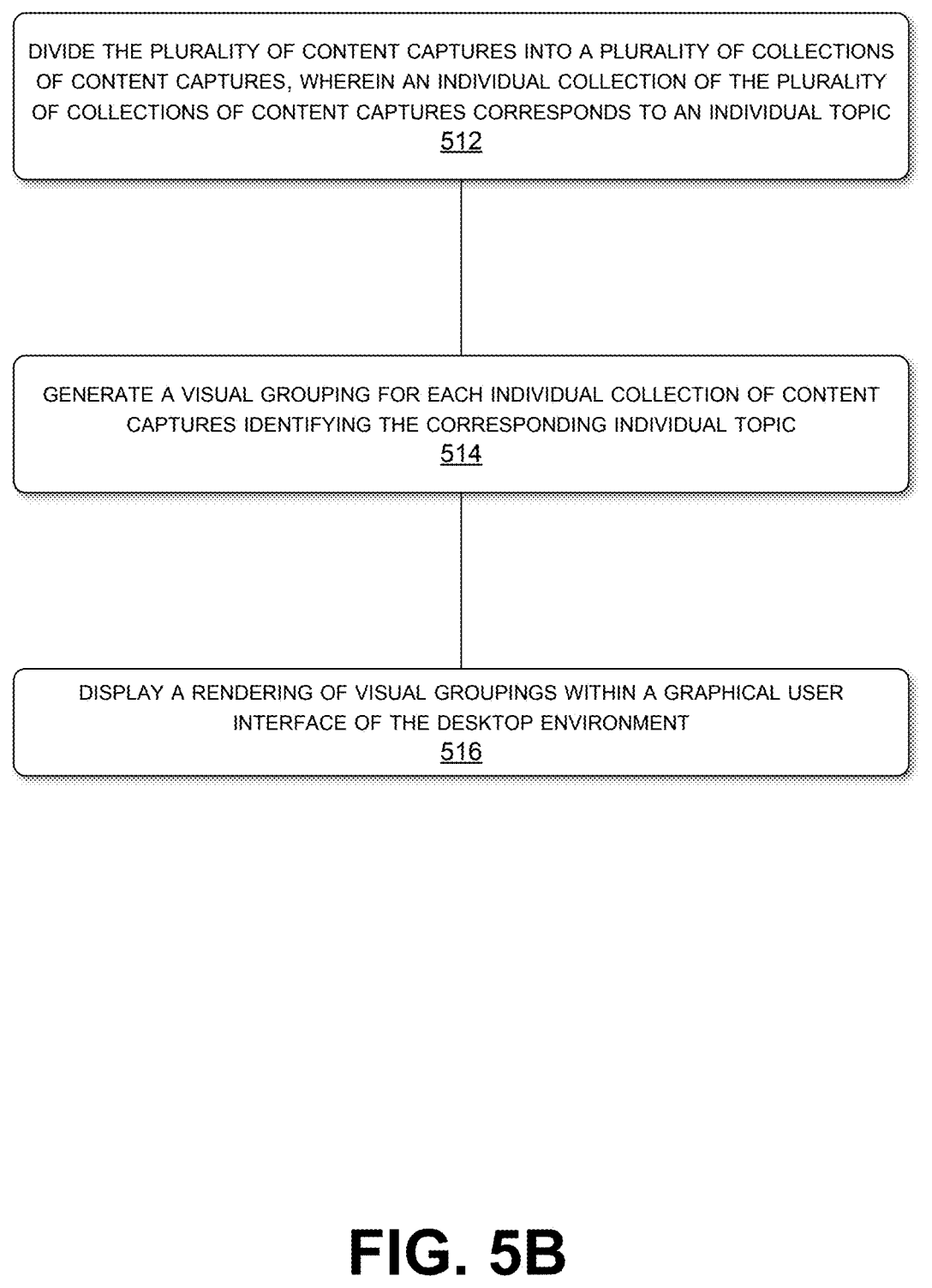

DIVIDE THE PLURALITY OF CONTENT CAPTURES INTO A PLURALITY OF COLLECTIONS OF CONTENT CAPTURES, WHEREIN AN INDIVIDUAL COLLECTION OF THE PLURALITY OF COLLECTIONS OF CONTENT CAPTURES CORRESPONDS TO AN INDIVIDUAL TOPIC
512

GENERATE A VISUAL GROUPING FOR EACH INDIVIDUAL COLLECTION OF CONTENT CAPTURES IDENTIFYING THE CORRESPONDING INDIVIDUAL TOPIC
514

DISPLAY A RENDERING OF VISUAL GROUPINGS WITHIN A GRAPHICAL USER INTERFACE OF THE DESKTOP ENVIRONMENT
516

FIG. 5B

AUTOMATIC ORGANIZATION OF USER ACTIVITY INTO COLLECTIONS BASED ON TOPICS

BACKGROUND

More and more of daily life occurs through computing devices, from completing assignments for work and school, to planning vacations, and online shopping. As such, a user may utilize a diverse array of software applications to accomplish various tasks. Moreover, a given software application can be transformed by different contexts. For instance, an internet browser can be utilized to look up nearby restaurants at one moment and research information for a presentation at another moment. Consequently, the user may lose track of what they were doing at a given moment as well as the context of that activity. To aid users in retracing their steps, many software applications include features for searching and retrieving content and/or activity, such as the browsing history in an internet browser and a listing of recent files in a file explorer.

However, existing features such as keyword-based searches, folder hierarchies, and app-specific organization tools may lack the ability to record context and decipher user intent. For example, a user may attempt a keyword search to recover a source of information for citation in a presentation. Unfortunately, the lack of specificity in existing approaches may prevent the user from finding the information for which they are looking. Moreover, such features place an additional burden on the user to remember exact details about their past activity such as the name of a website, title of an article, or other information. Manual recollection can be especially challenging due to the sheer amount of information the user generates and interacts with. That is, many existing systems place the onus on the user to spend time manually organizing, categorizing, and documenting information rather than accomplishing the tasks they wish to complete.

In addition, even in the event the user is able to return to the app, website, or other object they are searching for, existing systems may nonetheless lack the ability to restore the context of that object. For example, a user may succeed in retrieving a text document through a keyword search and/or manually navigating a file directory in a file explorer. However, the user may be unable to retrieve the context of the text document such as accompanying software applications that were previously opened. Furthermore, the information the user is searching for may have changed in the intervening time since their most recent access. For instance, the user may recall researching local restaurants but forget the resources they used, the names of certain restaurants, and so forth.

It is with respect to these and other considerations that the disclosure made herein is presented.

SUMMARY

The techniques disclosed herein provide a system for automatically organizing content captures of user activity into collections based on a shared topic and/or subject matter. As mentioned above, due to the significant portion of daily life that occurs via personal computing devices (e.g., laptops, personal computers, tablets, smartphones), service providers (e.g., operating system providers) may wish to enhance productivity and/or engagement through helpful user experiences. Such user experiences can be customized to a user's current context, preferences, and tendencies. As such, these user experiences can be enabled by collecting, with the consent of the user, a record of user activity such as a content capture (e.g., a screenshot) of a desktop environment. A content capture can also include text data, audio data, or any multimedia content data that is suitable for analysis. Generally described, a desktop environment is a graphical user interface abstraction of an operating system that enables a user to intuitively interact with software applications installed on a computing device.

In various examples, content captures are retrieved from an operating system component that detects certain moments of interest in user activity and, in response, generates a content capture recording the moment of interest. In a specific example, a content capture is generated when a user loads a new webpage. In another example, a content capture is generated when a user views and/or saves a file (e.g., a text document, a picture file). Over time, the operating system may generate a substantial number of content captures. In order to provide a useful user experience, the system presented herein analyzes and organizes the content captures into collections based on a shared topic (e.g., travel, restaurants, skiing).

An individual content capture (e.g., a screenshot) contains a plurality of regions that can be analyzed to define the semantic of context at the moment of interest represented by the individual content capture. Within the context of the present disclosure, such regions are principally text regions such as the name of a website, a title of a document, alt text image descriptions for accessibility, optical image recognition (OCR), and so forth. However, other types of regions containing contextual information can be considered such as images, icons, or other graphics. Accordingly, the system begins by retrieving a plurality of content captures from a content capture source.

For each individual content capture, the system detects the plurality of regions and then identifies a subset of the regions that contain relevant information (e.g., relevant text information). In addition, the system can extract supplemental text information such as a window title, user interface text, and the like. In a specific example, an individual content capture is a graphical capture that depicts a web browser displaying the homepage of a website. The content capture is provided to a first machine learning model that detects relevant regions of the content capture (e.g., a screen region detection model) and a second machine learning model that is configured to detect regions of extractable text information within the content capture (e.g., an optical character recognition model). Consequently, the first machine learning model and the second machine learning model identify overlapping regions of the content capture that contain relevant extractable text information. That is, while the second machine learning model identifies all of the extractable text regions of the content capture, the first machine learning model identifies regions of content captures that most likely contain relevant text information.

The relevant text information is then extracted from each individual content capture and preprocessed for analysis by a topic classification model. As will be described in an example below, preprocessing the text involves converting the text to lowercase, removing punctuation from the text, ordering the text based on location within the content capture, and breaking the text into smaller chunks that can be processed more quickly. Each chunk is then analyzed by the topic classification model to identify a topic. More specifically, the topic classification model identifies a plurality of probable topics for each chunk ranked by a calculated probability. The pluralities of topics for each chunk are then aggregated to the most likely topics based on the frequency of occurrence and/or mean probability across the chunks. In a specific example, the system assigns the highest ranked topic among the aggregated topics to the content capture as a primary topic. Alternatively, the system can assign multiple topics to a single content capture (e.g., the top N most probable topics).

In various examples, the visual analysis performed by the machine learning models is executed locally to the computing device to maintain user privacy and/or comply with data privacy regulations. That is, the content captures are not transmitted to any entities outside of the computing device (e.g., a cloud service) for analysis. In this way, the system provides helpful insights to user activity while maintaining security of the content captures by minimizing the risk of transmission.

Once each content capture is assigned one or more topics, the plurality of content captures are divided into a plurality of collections corresponding to individual topics. In various examples, an individual collection is not restricted to a specific activity type or origin and can include content captures of any type of interaction with the computing device that is relevant to the associated topic. In a specific example, the system generates a topic for travel planning that includes content captures of a websites, text documents, chat messages, photographs, and so forth. Moreover, multiple collections can include the same content capture in the event the content capture is assigned multiple topics. For instance, a content capture of an article on home décor can be included in a "home décor" collection as well as a "kitchen remodel" collection.

Accordingly, the collections are rendered in a graphical user interface (GUI) as a visual grouping of graphical collections. In this way, the collections preserve relevant interactions for associated topics that a user can readily access in one place. Moreover, each rendering of a content capture can include a shortcut element that enables the user to return to, or recall, the specific context of the content capture such as a specific location on a website, a portion of a document, and/or a particular file.

The techniques described herein address several technical challenges facing users of modern computing devices (e.g., laptops, personal computers, smartphones, tablets). Foremost among these challenges is organizing and keeping track of the sheer amount of information and content a user generates and interacts with on a daily basis. From chat messages to photos, recipes, slide decks, and text documents, manually recalling past activity, much less the context that informed the user's experience of that activity, can be infeasible. By occasionally taking a content capture of the desktop environment and leveraging visual analysis tools, the present system can preserve a "memory" of a user's activity at a given moment while retaining contextual information that can help the user to recall their state of mind at that moment. In this way, the present system introduces enhanced functionality beyond existing search and retrieval tools, such as a browsing history in an internet browser, thereby providing an enriched and engaging user experience.

In another example of the technical benefit of the present disclosure, the disclosed techniques provide improved efficiency for computing devices by reducing the amount of time a user spends recalling information and/or content, and the associated device processing power required to execute the user's tasks. By providing an automatically organized location that the user can intuitively search through, the present system enables the user to quickly find relevant moments of interest for a given topic. For example, a user may recall that they were planning a ski trip. However, the user may not remember what they were specifically doing, such as looking up gear reviews on a certain website, downloading trail maps, and so forth. Accordingly, the user can simply select the "skiing" collection and recall exactly which software applications were open, what information was displayed, and the like. Consequently, the automatic collections reduces computing resource usage that would have otherwise been expended when searching and returning to the previous state.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5A is a flow diagram showing aspects of a process for automatically assigning topics to content captures.

FIG. 5B is a flow diagram showing aspects of a process for organizing content captures into collections based on a shared topic.

DETAILED DESCRIPTION

The techniques described herein provide systems for automatically organizing records of user activity into collections based on a shared topic as well as a graphical user interface (GUI) facilitating intuitive interaction with the collections. This is accomplished by gathering content captures depicting a record of user activity such as graphical captures (e.g., screenshots) of a desktop environment, textual captures, audio captures (e.g., recordings), and so forth. Generally described, an individual content capture includes a software application that is currently in focus at a given moment in time. The content capture is then analyzed to determine a topic (e.g., sports, dining, shopping). Content captures are then organized into collections according to the topic determined for each content capture. Renderings of the collections are then displayed in a graphical user interface for the user to interact with.

Various examples, scenarios, and aspects related to the techniques are described below with respect to FIGS. 1-6.

Figure 1:
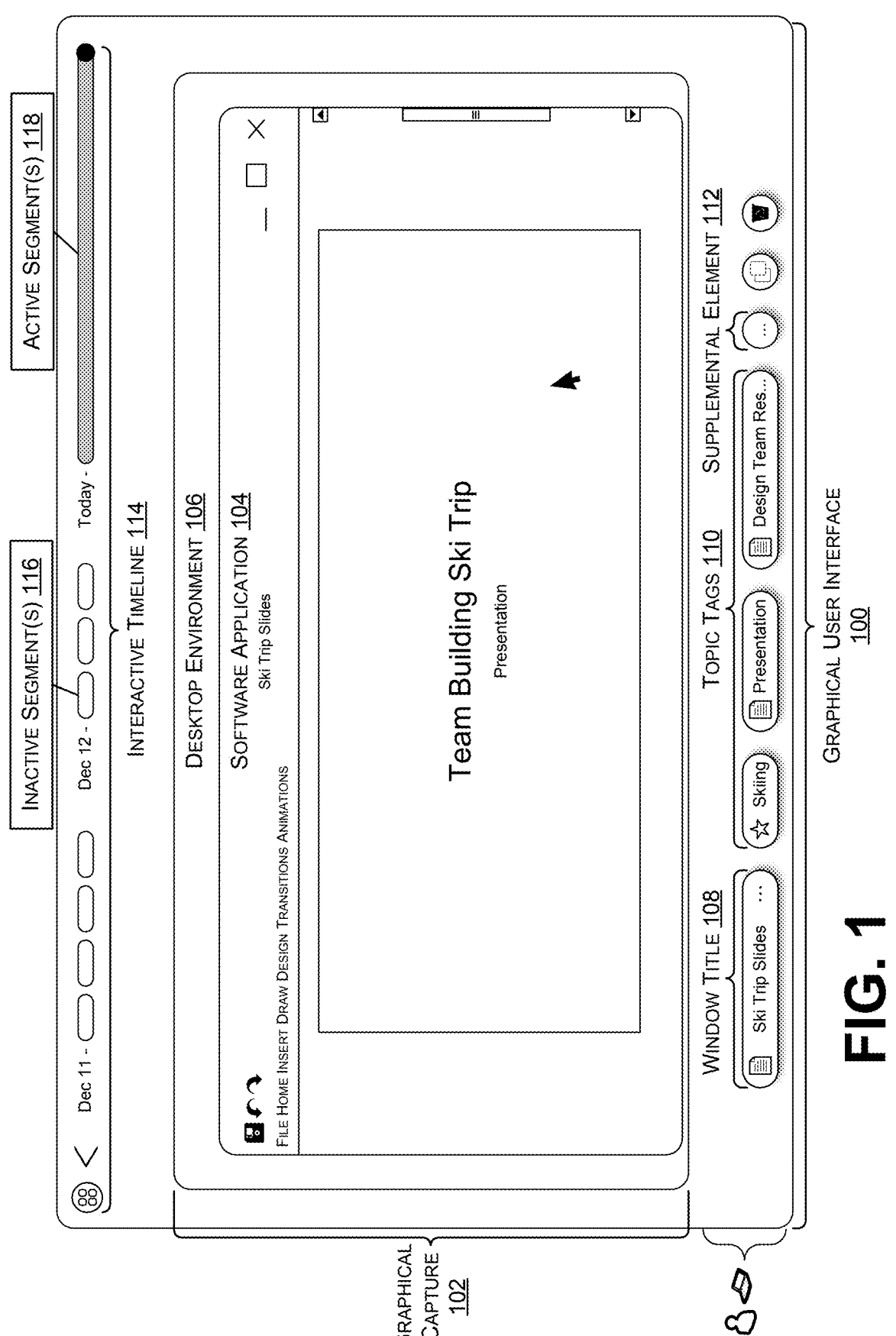
FIG. 1 illustrates an example user interface for viewing and interacting with an individual content capture.

FIG. 1 illustrates a graphical user interface 100 that enables user interaction with a graphical capture 102 depicting a software application 104 (a presentation editor) within a desktop environment 106. It should be understood that the graphical capture 102 shown in FIG. 1 is a specific example of a content capture and that other types of content captures are also contemplated here (e.g., a text capture, an audio capture). As will be elaborated upon below, the graphical capture 102 is analyzed to detect and extract pertinent text information to determine the semantic context of the graphical capture 102 and assign a topic. As shown, the user, at the time the graphical capture 102 was generated, was working on a slide presentation titled "Team Building Ski Trip".

Accordingly, the system disclosed herein can identify a region of the graphical capture 102 in which the "Team Building Ski Trip" title is displayed and extract the text for processing. In addition, the system can detect a window title 108 of the software application 104. In the present example, the window title 108 of the software application 104 is "Ski Trip Slides" which can offer additional detectable context such as a type of file (e.g., a file extension), a file title, and so forth. Moreover, the window title 108 is displayed within the graphical user interface 100 as a supplemental element along with the graphical capture 102.

Based on an analysis of the available information within the graphical capture 102, the graphical capture 102 is assigned the topic tags 110 as shown in FIG. 1. In various examples, the graphical capture 102 is assigned one or more topic tags 110 that are determined by the system as most probable based on the text information extracted from the graphical capture 102. For example, the system determines that the term "Ski Trip" in both the window title 108 and the body of the presentation slides strongly indicates that the graphical capture 102 has to do with skiing. Accordingly, the graphical capture 102 is assigned a "skiing" topic tag 110. In another example, the system determines that, based on the source of the graphical capture 102 (the software application 104) and/or the "Presentation" subtitle, that the graphical capture 102 depicts a slide presentation. As shown, the graphical capture 102 is also assigned a "presentation" topic tag 110.

In still another example, the user may manually create a custom topic collection called "Design Team Resources" to organize their work relating to their design team (e.g., coworkers, clients). Accordingly, the user can manually place the graphical capture 102 into their custom topic collection. As a result, the graphical user interface 100 further includes a "Design Team Resources" topic tag 110 for the graphical capture 102. In various examples, the displayed topic tags 110 may be a top N number of topics assigned to the graphical capture 102 (e.g., the top three topics). As such, the graphical capture 102 may be assigned additional topics that are not displayed in the topic tags 110. These additional topics can be viewed by selecting the supplemental element 112. Alternatively, the supplemental element 112 can enable the user to manually add the graphical capture 102 to additional topics such as custom topics created by the user.

In a specific example, the user adds the graphical capture 102 to a "Project Contoso 2024 Trip" in which "Project Contoso" is an internal work project. That is, custom user-created topics can have an inherent meaning to the associated user that is not necessarily understood by an automatic organization system. By creating a custom topic, the user can establish a new topic string that can be incorporated by the automatic organization system to identify semantically related content and/or suggest additional content for inclusion in the custom topic based on the relationship defined by the user.

In various examples, the graphical user interface 100 includes an interactive timeline 114 that includes segments representing individual graphical captures. The segments of the interactive timeline 114 can be filtered between inactive segments 116 (which are indicated in FIG. 1 with no shading) and active segments 118 (which are indicated in FIG. 1 with gray shading). Generally described, a segment transitions from an inactive segment 116 to an active segment 118 in response to a user selection of an individual graphical capture 102. For instance, the active segment 118 shown in FIG. 1 represents the graphical capture 102 while the inactive segments 116 represent other graphical captures that belong to the same collection as the graphical capture 102. That is, the interactive timeline 114 is filtered to represent the graphical capture 102. In this way, the user can gain an intuitive overview of their past activity that is customized to the current context of the graphical user interface 100. In additional examples discussed below, the interactive timeline 114 can transition from representing an individual graphical capture 102 to the plurality of graphical captures within a collection as well as representing multiple collections. In other words, the interactive timeline 114 is rendered based on the context of the greater graphical user interface (e.g., viewing a single graphical capture, viewing a collection of graphical captures, viewing a plurality of collections).

Figure 2:
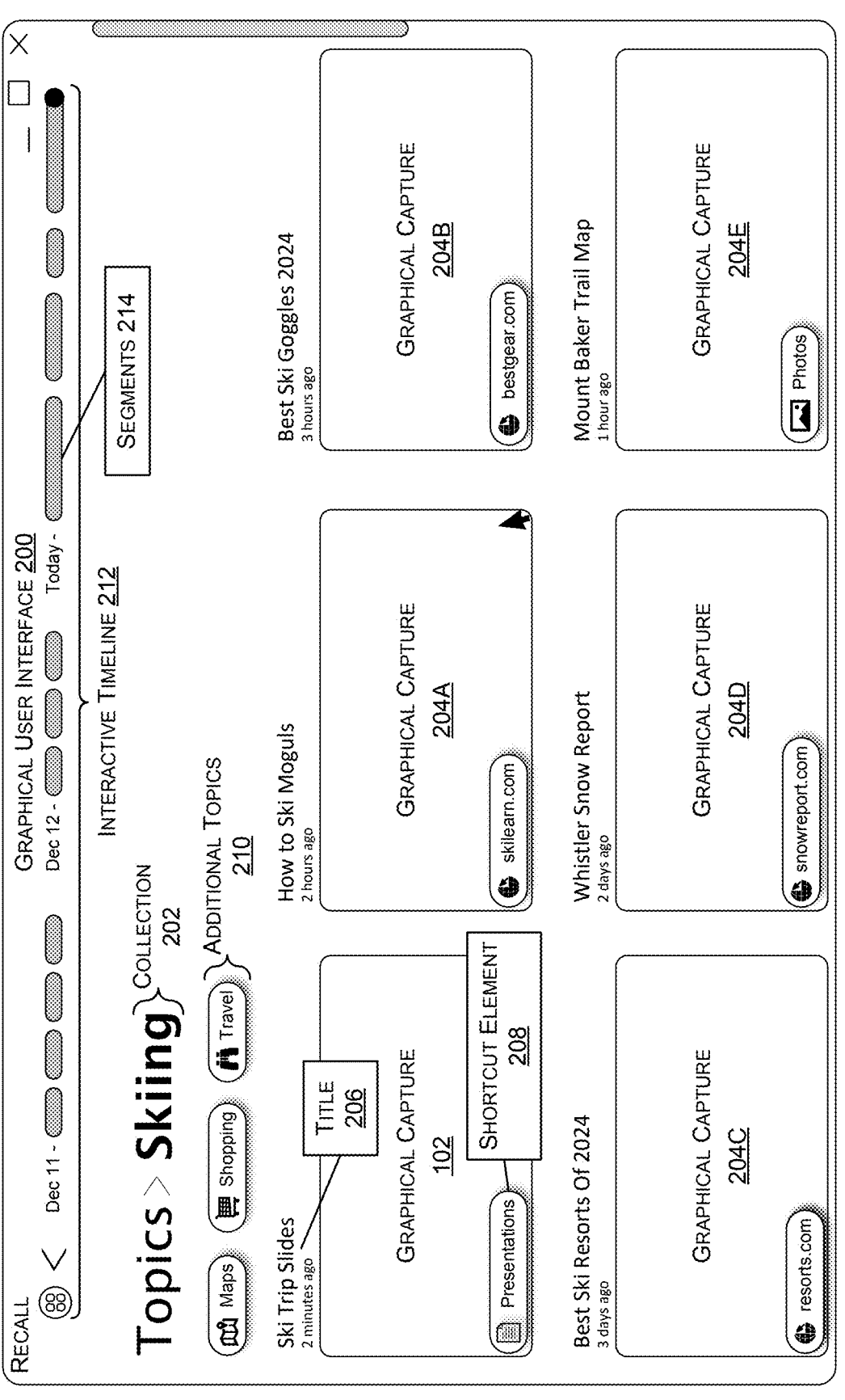
FIG. 2 illustrates an example user interface for viewing and interacting with a collection of content captures.

Turning now to FIG. 2, aspects of a graphical user interface 200 for viewing and interacting with a collection 202 of graphical captures 102 and 204A-204E are shown and described. As mentioned above, the graphical captures 102 and 204A-204E are specific examples of content captures and it should be understood that any suitable content capture can be utilized (e.g., a text capture, an audio capture). In the present example, the graphical user interface 200 displays a rendering of a collection 202 for a "Skiing" topic. For purposes of discussion, the example illustrated in FIG. 2 can be understood as ascending up a level from the example of FIG. 1. That is, where the user interface 100 of FIG. 1 enabled a user to view and interact with a single graphical capture 102, the user can then transition from the user interface 100 to the graphical user interface 200 of FIG. 2 to view and manage the full collection 202 of graphical captures 102 and 204A-204E for the "Skiing" topic. Conversely, a user may enter the graphical user interface 200 by selecting the collection 202 from a plurality of available collections.

For each of the individual graphical captures 102 and 204A-204E of the collection 202, the graphical user interface 200 additionally includes a title 206 derived from the content of the graphical capture 102. In various examples, the title 206 is the file name of a file associated with the individual graphical capture 102. For instance, the title 206 for the graphical capture 102 is the window title 108 "Ski Trip Slides" of the presentation file described above. In an alternative example, the title 206 may be automatically generated. For instance, the title for the graphical capture 204A is the headline of an online article "How to Ski Moguls".

Furthermore, each rendering of the graphical captures 102 and 204A-204E also includes a shortcut element 208 that is configured to restore the semantic context of the associated graphical captures 102 and 204A-204E. As shown, the shortcut element 208 indicates the source of the associated graphical capture 102 such as the name of an application (e.g., "Presentations", "Photos"), the name of a website (e.g., "skilearn.com"), and the like. As such, the user can see where the shortcut element 208 leads. For example, for the graphical capture 102, if the user selects the shortcut element 208, the presentation editor application will launch and open the "Ski Trip Slides" file. In another example, the graphical capture 204C depicts an online article for the "Best Ski Resorts Of 2024". Accordingly, the shortcut element for the graphical capture 204C, showing the "resorts.com" website name, will launch the web browser and navigate to the online article depicted in the graphical capture 204C.

In addition, the view of the graphical captures 102 and 204A-204E can be optionally refined by the user by selecting one or more of the additional topics 210 to accompany the "Skiing" topic. That is, the additional topics 210 filter which of the graphical captures 102 and 204A-204E are displayed in the graphical user interface 200. For example, if the user selects the "Maps" additional topic 210, some of the graphical captures 102 and 204A-204E will be filtered from view such as the "Ski Trip Slides" graphical capture 102 and the "Best Ski Goggles 2024" graphical capture 204B. Others that have both the "Skiing" topic and the "Maps" topic assigned are retained. For instance, the "Mount Baker Trail Map" graphical capture 204E will remain displayed in the graphical user interface 200. In another example, deselecting the "Maps" additional topic 210 and selecting the "Shopping" additional topic 210 will retain the "Best Ski Goggles 2024" graphical capture 204B while filtering the "How to Ski Moguls" graphical capture 204A.

The graphical user interface 200 can be further configured to include an interactive timeline 212 comprising segments 214 representing the graphical captures 102 and 204A-204E of the collection 202. As will be described below, a different interactive timeline can include segments representing graphical captures spanning a plurality of collections. Upon receiving a user selection of a specific collection 202, the segments of the interactive timeline are filtered to represent the specific graphical captures 102 and 204A-204E of the selected collection 202. As shown by the gray shading, all of the segments 214 are active segments as described above due to the filtering based on the selected collection 202. That is, the interactive timeline 212 is customized to the context of the graphical user interface 200. Namely, the interactive timeline 212 represents the graphical captures 102 and 204A-204E of the "Skiing" collection 202.

Figure 3:
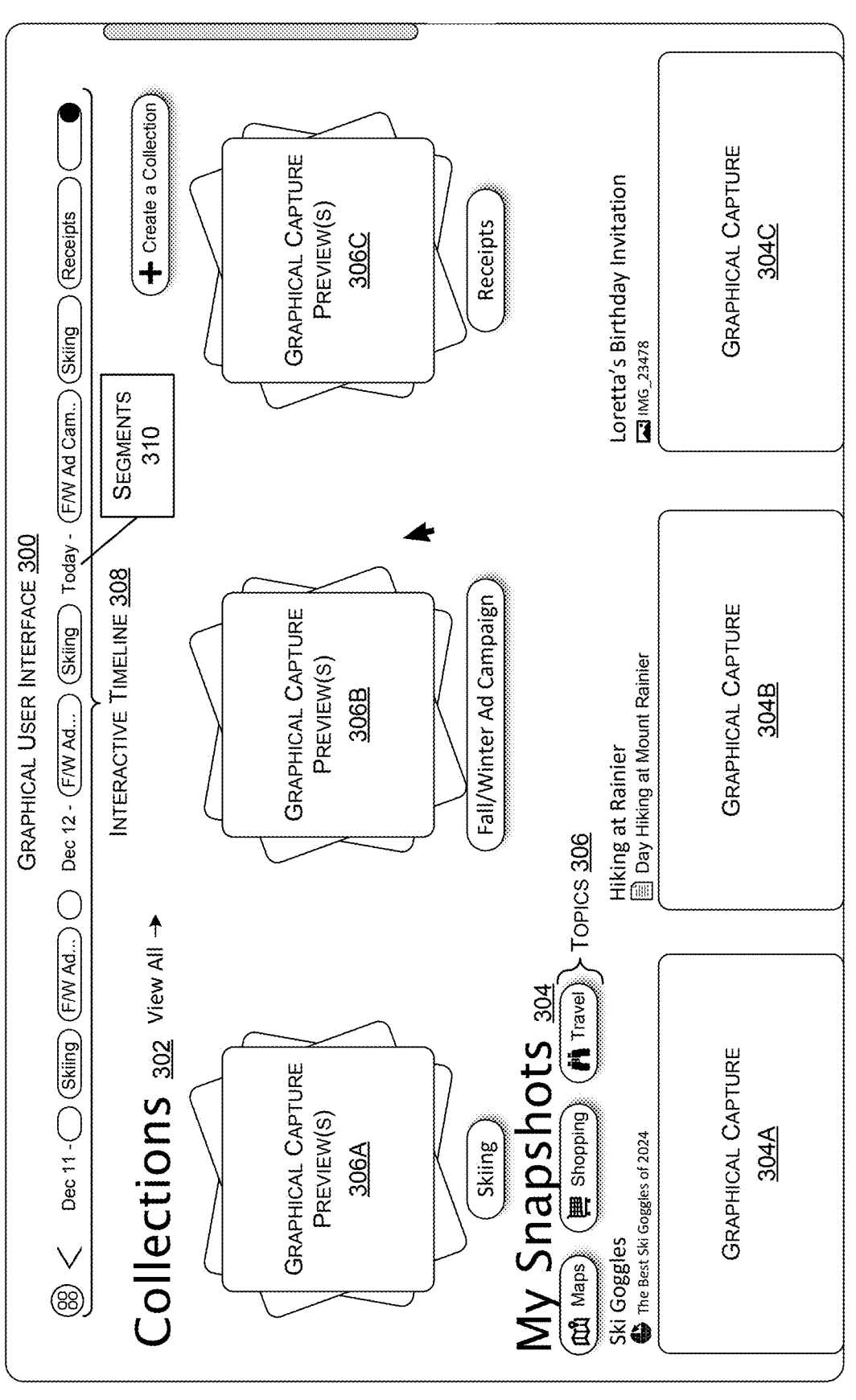
FIG. 3 illustrates an example user interface of a home page for accessing collections of content captures as well as individual content captures.

Turning now to FIG. 3, aspects of a graphical user interface 300 providing an overview of available collections 302 as well as individual graphical captures 304, illustrated here as "Snapshots". As with the examples described above, the graphical captures 304 shown in FIG. 3 are specific examples of content captures and it should be understood that any suitable type of content can be utilized in a content capture (e.g., a text capture, an audio capture). As shown in FIG. 3, the graphical user interface 300 displays three collections 302. Moreover, each collection 302 includes a graphical capture preview 306A-306C providing an initial view of some of the graphical captures within each of the collections 302. Accordingly, a user can select one of the collections 302 to inspect the graphical captures via the user interface 200 described above with respect to FIG. 2.

In various examples, the collections 302 are ordered within the graphical user interface 300 based on the most recent user access. That is, the first (e.g., the leftmost) collection 302 is the last one the user opened. In another example, the collections 302 are ordered based on a frequency of user access. In other words, the collections 302 that the user opens most often are shown in the overview graphical user interface 300 while less frequently used collections can be viewed by selecting the "View All" element. In a third example, the collections 302 are ordered based on a number of graphical captures in each of the collections 302. For the example of FIG. 3, the "Skiing" collection is placed first in the graphical user interface 300 at least in part due to the number of graphical captures within the "Skiing" collection being greater than the number in the "Fall/Winter Ad Campaign" collection indicating an elevated level of user interaction with the associated "Skiing" topic.

In still another example, the collections 302 are ordered based on an automatically generated suggestion based on a user's current context. For instance, the system may display the "Fall/Winter Ad Campaign" collection 302 during daily working hours on the assumption that such a collection may be useful during that time of day. In another instance, the system may detect that the user is using a web browser to research skiing gear. In response, the "Skiing" collection 302 is displayed in the overview graphical user interface 300. Accordingly, the user can adjudicate these automatic suggestions to improve their usefulness. For example, while the "Fall/Winter Ad Campaign" collection 302 may be helpful during working hours, the user may have already completed their work regarding that particular context. As such, the user can inform the system that a particular collection 302 is not useful to them at the present time. This adjudication can be used to refine future suggestions. It should be understood that the collections 302 can be ordered in any suitable manner including custom ordering based on a user selected criteria.

In a specific example, the collections 302 are ordered according to a logical hierarchy. Collections 302 that are favorited (e.g., pinned) are placed at the top of the logical hierarchy with consideration for the recency of the favoriting. For instance, collections that have been favorited the longest are ordered first. That is, a collection that was favorited four months ago is displayed before a collection that was favorited three months ago. Custom user-created collections are placed in the next tier of the logical hierarchy. In the event there are no favorited collections and/or not enough favorited collections to fill the available space of the graphical user interface 300, custom user-created collections are displayed according to their date of creation. For instance, a collection that was created one month ago is ordered ahead of a collection that was created two months ago. After the favorited collections and the custom user-created collections is the automatically generated collections. Automatically generated collections can be ordered according to the number of graphical captures each contains. For example, an automatically generated collection containing one hundred graphical captures is ordered ahead of another automatically generated collection containing fifty graphical captures.

Likewise, the graphical user interface 300 includes a display of selected graphical captures 304A-304C. Similar to the collections 302, the graphical captures 304A-304C can be ordered based on recency of user access, frequency of access, automatic suggestions, user preferences (e.g., alphabetical order, creation date), and/or any combination thereof. That is, a user may optionally select one or more preferred ordering criteria to organize their view of the collections 302 and/or the graphical captures 304A-304C. Moreover, the graphical captures 304A-304C can be filtered based on a selected topic 306. For example, selecting the "Shopping" topic 306 will retain the "Ski Goggles" graphical capture 304A while removing the "Hiking at Rainier" graphical capture 304B and the "Loretta's Birthday Invitation" graphical capture 304C. Accordingly, other graphical captures that have the "Shopping" topic assigned can be surfaced to replace the removed graphical captures 304B and 304C.

Furthermore, the overview graphical user interface 300 also includes an interactive timeline 308 comprising segments 310 representing the collections 302. In contrast to the interactive timeline 212 discussed above in which individual segments 214 represented individual graphical captures, an individual segment 310 of the interactive timeline 308 represents a plurality of graphical captures of an individual topic. As shown in FIG. 3, individual segments 310 are labeled with the topic of the associated collection (e.g., a "Skiing" segment, a "Receipts" segment). Accordingly, if a user selects one of the collections 302, the interactive timeline 308 is filtered such that segments 310 that do not relate to the topic of the selected collection are removed.

Figure 4A:
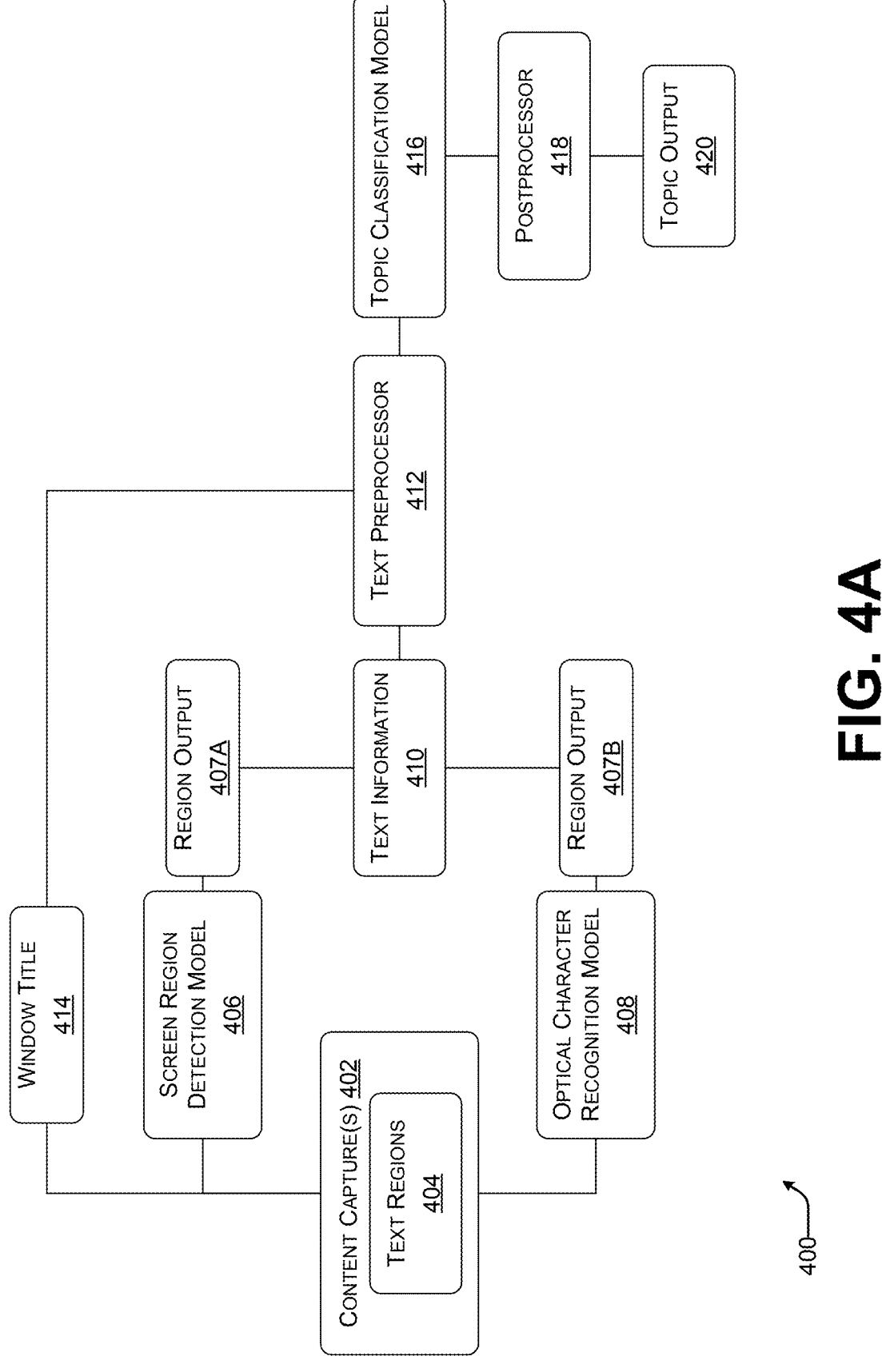
FIG. 4A is a block diagram of a processing pipeline for analyzing and assigning a topic to an individual content capture.

Turning now to FIG. 4A, aspects of a processing pipeline 400 for performing a visual analysis of a content capture 402 to extract text information and assign a topic are shown and described. As mentioned above, a content capture 402 includes a plurality of text regions 404 that define the semantic context of the content capture 402. For example, a content capture 402 depicting a homepage for a restaurant contains text regions 404 that generally relate to the topic of restaurants such as the name of the restaurant, menus, reservations, and so forth.

Accordingly, the content capture 402 is input to two different machine learning models to detect and extract relevant text information. The first machine learning model, a screen region detection (SRD) model 406, is configured to identify certain regions of the content capture 402 that most likely contain relevant text information via a region output 407A. In various examples, this is accomplished by calculating an inferential information density across the depicted area of the content capture 402. As will be described below, the screen region detection model 406 can generate a bounding box to define the regions it determines most likely to contain relevant information.

The second machine learning model is an optical character recognition (OCR) model 408 that is configured to convert images of typed, handwritten and/or printed text into machine-encoded text. As such, the optical character recognition model 408 may identify all of the text regions 404 in the content capture 402 via a region output 407B. However, not all of the text regions 404 may be useful for analysis (e.g., contributes to system accuracy and/or relevance). Accordingly, the text regions 404 identified by the optical character recognition model 408 are matched with regions of relevant information identified by the screen region detection model 406 to identify a subset of the text regions 404 that contain relevant text information.

The optical character recognition model 408 subsequently extracts a set of text information 410 from the text regions 404 of the content capture 402. The text information 410 is then provided to a text preprocessor 412 to prepare the text information 410 for analysis. In various examples, the text preprocessor 412 converts the text information 410 to lowercase and removes extraneous characters such as punctuation and formatting to improve the accuracy of the analysis. In addition, the text preprocessor 412 splits the text information 410 into smaller chunks to improve downstream processing efficiency. In various examples, the text preprocessor 412 prepares the chunks with an overlapping portion in which the final portion of a first chunk is the same as the first portion of a second chunk. Moreover, the text preprocessor 412 is configured with a threshold chunk length with which to split up the text information 410 (e.g., ten words, eighty-five words). The threshold chunk length can be calculated as a function of the available resources (e.g., memory, computing cores, battery) and/or optimized for system accuracy when assigning topics.

Furthermore, the chunks of text information 410 are ordered based on their appearance within the content capture 402. For instance, text that appears at the top of the content capture 402 will be placed in an earlier chunk in relation to text that appears at the bottom of the content capture 402. In addition, the text preprocessor 412 can also retrieve a window title 414 from the content capture 402. As mentioned above, the window title 414 can provide additional contextual information that is helpful for determining a topic for the content capture 402.

Accordingly, the text preprocessor 412 provides the prepared text information 410 to a topic classification model 416 that is configured to infer one or more plausible topics for each of the chunks of text information 410. Within the context of the present disclosure, the topic classification model 416 can be considered a third machine learning model where the first machine learning model is the screen region detection model 406 and the second machine learning model is the optical character recognition model 408. The inferred chunk topics are then aggregated by a postprocessor 418 and ranked to determine a list of the most probable topics for the content capture 402. As such, the topic output 420 is the ranked list of most probable topics for the content capture 402 (e.g., "Korean food", "restaurants", "restaurant reviews").

In various examples, the topic classification model 416 is a machine learning model that is executing locally on the user device that generated the content capture 402 (e.g., a laptop, a personal computer, a tablet, a smartphone). In this way, the processing pipeline 400 does not transmit data out of the user device thereby maximizing user data privacy. However, in some scenarios, a user may wish to leverage increased processing power and more advanced computational models such as large language models (LLMs) to organize their content captures 402. Accordingly, after obtaining user consent, the processing pipeline 400 can transmit the content captures 402 and/or the text information 410 to a cloud-based topic classification model 416 that is external to the user device.

In a specific example, a content capture 402 may contain insufficient text information 410 (e.g., primarily pictorial information), and thus, require additional visual analysis. As such, the content capture 402 is transmitted to the cloud-based topic classification model 416 for analysis by a large language model. However, to maintain user data privacy and/or security, content captures 402 containing sensitive information can be restricted from transmission to the cloud-based topic classification model 416. For instance, a content capture 402 depicting a file from a private user folder can be designated as sensitive data, and thus, can only be processed by a local topic classification model 416.

Figure 4B:
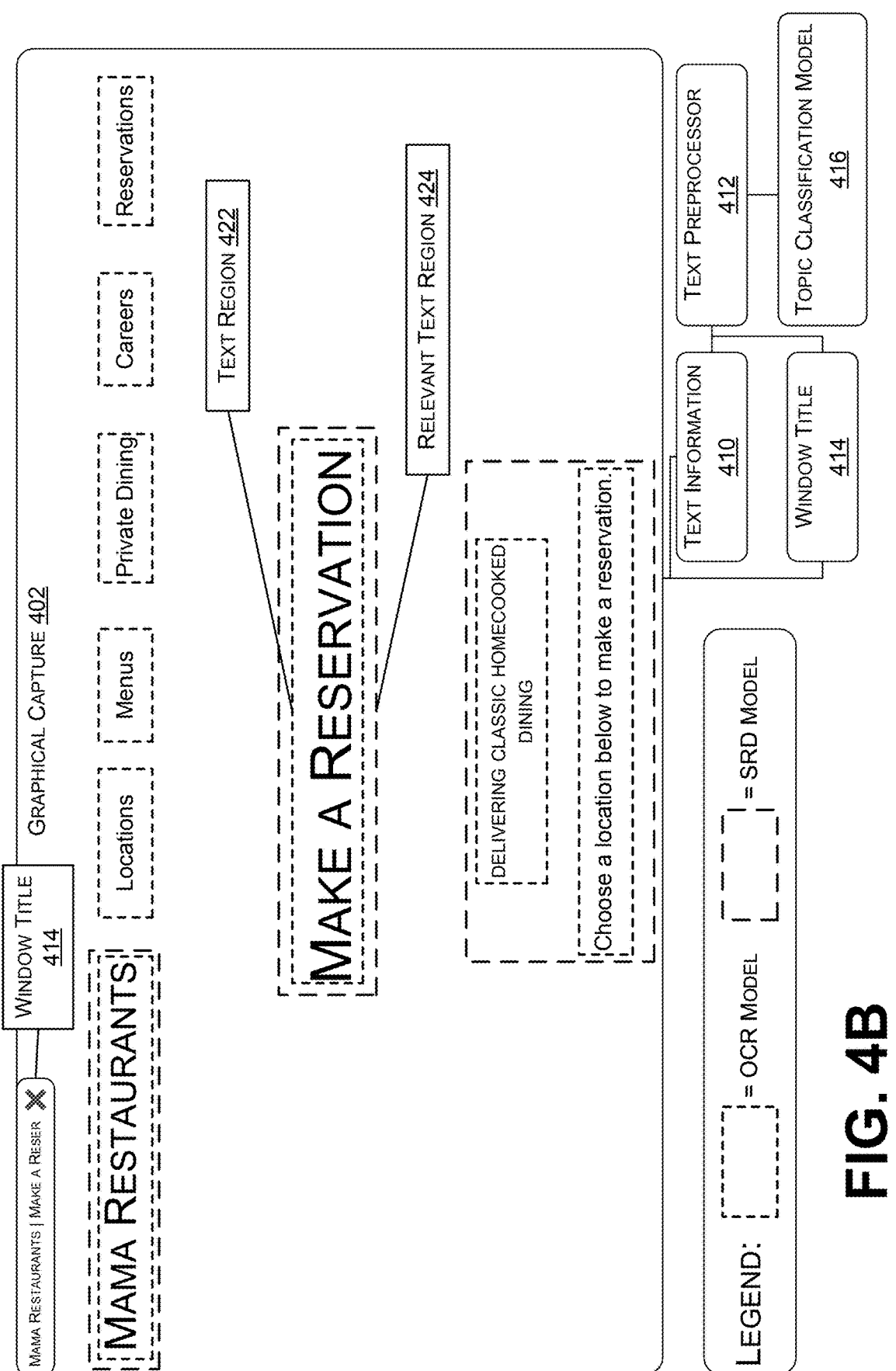
FIG. 4B illustrates a visualization of the analysis performed by the processing pipeline for detecting and extracting text information from a content capture.

Proceeding to FIG. 4B, aspects of a specific example of the visual analysis performed by the processing pipeline 400 for a content capture 402 are shown and described. As indicated by the window title 414, the content capture 402 depicts a reservations page of a website for "Mama Restaurants". Accordingly, the content capture 402 is analyzed by the screen region detection model 406 and the optical character recognition model 408 described above to identify the text regions 422 and relevant text regions 424 of the content capture 402.

As shown in the legend of FIG. 4B, the optical character recognition model 408 identifies the text regions 422 (indicated by bounding boxes with short dashes) while the screen region detection model 406 identifies the relevant text regions 424 (indicated by bounding boxes with long dashes). Moreover, while every relevant text region 424 is necessarily a text region 422, not all text regions 422 are necessarily relevant text regions 424. For instance, the webpage depicted by the content capture 402 includes user interface elements such as "Locations", "Menus", "Private Dining", and so forth that are identified by the optical character recognition model 408 as text regions 422 but not identified by the screen region detection model 406 as relevant text regions 424.

Conversely, the region of the content capture 402 stating "Make a Reservation" is identified by the optical character recognition model 408 as a text region 422 as well as the screen region detection model 406 as a relevant text region 424. As such, the "Make a Reservation" region can be said to be region matched and thus contains relevant text information. Accordingly, the text information of region matched portions of the content capture 402 are extracted as the text information 410 along with the window title 414 and input to the text preprocessor 412. In the present example, the extracted window title 414 is "MAMA Restaurants | Make a Reservation". Likewise, the extracted text information 410 in accordance with the region matching is "MAMA RESTAURANTS MAKE A RESERVATION DELIVERING CLASSIC HOMECOOKED DINING Choose a location below to make a reservation."

As mentioned above, the extracted text information 410 and the window title 414 are reformatted by the text preprocessor 412 as lowercase and without punctuation resulting in the following string: "mama restaurants make a reservation mama restaurants make a reservation delivering classic homecooked dining choose a location below to make a reservation". The text preprocessor 412 then splits the reformatted text information 410 into smaller chunks based according to a threshold chunk length (e.g., ten words) and with overlapping resulting in the following strings.

['mama restaurants make a reservation mama restaurants make a reservation'],

['make a reservation delivering classic homecooked dining choose a'],

['dining choose a location below to make a reservation'].

It should be understood that while the chunks shown above are ten words in length, any suitable chunk length can be used in practice (e.g., eighty-five words). Subsequently, the chunks of text information 410 are each analyzed by the topic classification model 416 to determine a list of plausible topics. In various examples, the plausible topics for each chunk are ranked according to a confidence score for each topic quantifying the probability of that topic as calculated by the topic classification model 416. In various examples, the confidence score is normalized, e.g., a confidence score that approaches "1" represents a probability approaching 100%. For the example of FIG. 4B, see table 1 below showing the text chunks and inferred chunk topics with confidence scores.

TABLE 1

| Text Chunks and Inferred Chunk Topics | |
|---|---|
| Text Chunks | Inferred Chunk Topics |
| ['mama restaurants make a reservation mama restaurants make a reservation'] | 'restaurants': [0.9866295]<br>'restaurant business': [0.8550548]<br>'restaurant reservations: [0.6473929] |
| ['make a reservation delivering classic homecooked dining choose a'] | 'restaurants: [0.77074885]<br>'dining': [0.7674806]<br>'fine dining: [0.5291038] |
| [dining choose a location below to make a reservation'] | 'dining': [0.79791677]<br>'fine dining': [0.5285482]<br>'restaurants': [0.50497603] |

The inferred chunk topics are then aggregated to calculate a ranked list of topics for the overall content capture 402 based on a number of inferences across the chunks and/or a mean probability. For the example inferred chunk topics shown in table 1, table 2 below shows the aggregated results.

TABLE 2

| Aggregated Inferred Topic Results | | | |
|---|---|---|---|
| Rank | Topic String | No. of Inferences | Mean Probability |
| 1 | "restaurants" | 3 | 0.754 |
| 2 | "dining" | 2 | 0.784 |
| 3 | "fine dining" | 2 | 0.529 |
| 4 | "restaurant business" | 1 | 0.855 |
| 5 | "restaurant reservations" | 1 | 0.647 |

Accordingly, the content capture 402 can be assigned one or more of the topics from ranked list of aggregated inferred topics. The content capture 402 is then organized into one or more collections according to the one or more assigned topics and presented for user interaction in a graphical user interface as described above with respect to FIGS. 1-3. In this way, the collections preserve all of the relevant interactions for associated topics that a user can readily access in one place. Moreover, each rendering of a content capture can include a shortcut element that enables the user to return to recall the specific context of the content capture such as a specific location on a website, a portion of a document, and/or a particular file.

Turning now to FIGS. 5A and 5B, aspects of a process 500 for automatically organizing content captures into collections based on shared topics are shown and described. With respect to FIG. 5A, the process 500 begins at operation 502 where a system retrieves a plurality of content captures of a desktop environment. An individual content capture includes a plurality of text regions defining a semantic context of the individual content capture. As mentioned above, while the system described herein principally utilizes text to derive the semantic context of individual content captures, other methods are considered such as images.

Then, at operation 504, the system detects the plurality of text regions for each content capture of the plurality of content captures. In various examples, this is accomplished by providing the content capture to an optical character recognition model that is configured to convert images to text into computer-encoded text that can be operated upon and analyzed. As described above, the optical character recognition model can generate a bounding box about each text region within the content capture.

Next, at operation 506, the system identifies a subset of the plurality of text regions containing relevant text information. As discussed above, not all text regions will contain relevant information for determining a topic for the content capture. Accordingly, a screen region detection model can identify certain regions of the content capture that most likely include relevant information. In various examples, this is accomplished by calculating a probabilistic information density for the area within the content capture.

Subsequently, at operation 508, the system determines one or more topics based on a textual analysis of the subset of the subset of the plurality of text regions. As described above, a topic classification model is configured to determine a ranked list of plausible topics for individual portions of the text extracted from the content capture (e.g., chunks). The plausible topics are then aggregated to assign one or more topics to the content capture based on an inference frequency (e.g., the number of times a given topic is assigned across the chunks) and/or a mean topic probability.

Finally, at operation 510, the system assigns the one or more topics to each of the plurality of content captures. As described above, the one or more topics can be displayed within a graphical user interface as topic tags to provide an overview of the assigned topics.

Turning now to FIG. 5B, the process 500 proceeds to operation 512 in which the system divides the plurality of content captures into a plurality of collections of content captures, wherein an individual collection of the plurality of collections of content captures corresponds to an individual topic. As mentioned above, an individual content capture can be placed into multiple collections if it is assigned multiple topics. For instance, a receipt for an online order from a skiing gear shop can be assigned to both an "sports equipment" collection as well as a "skiing" collection.

Then, at operation 514, the system generates a visual grouping for each individual collection of content captures identifying the corresponding individual topic. As described above, each collection can include a visual preview of the content captures contained within each collection. Moreover, selecting an individual collection filters an accompanying interactive timeline comprising segments representing individual content captures and/or collections of content captures. Finally, at operation 516, the system displays a rendering of the visual groupings within a graphical user interface of the desktop environment.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can begin and/or end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
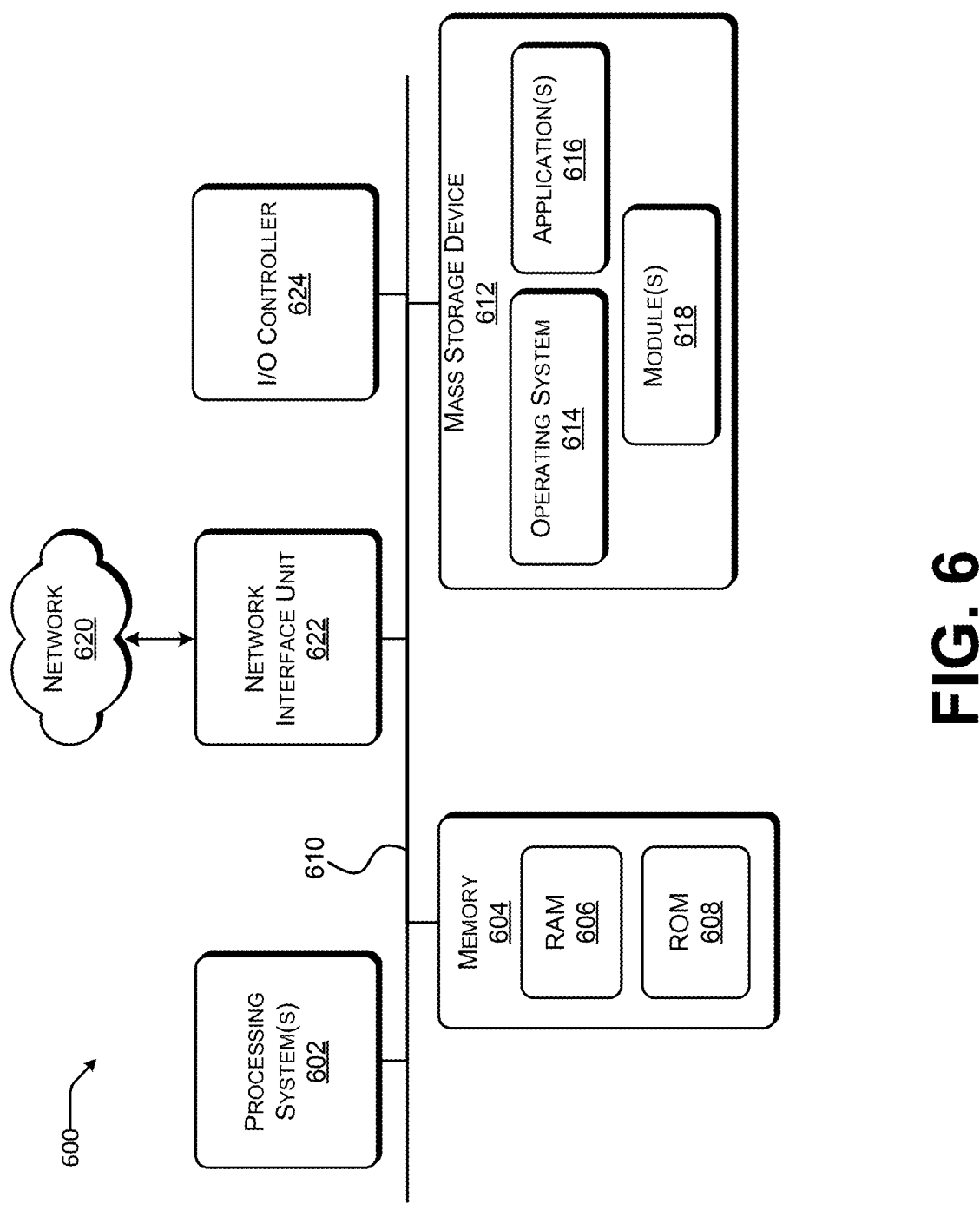
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s).

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

The disclosure presented herein also encompasses the subject matter set forth in the following clauses.

Example Clause A, a method for organizing a plurality of content captures into collections according to shared topics comprising: retrieving the plurality of content captures of a desktop environment, wherein an individual content capture includes a plurality of text regions defining a semantic context of the individual content capture; for each individual content capture of the plurality of content captures: detecting the plurality of text regions included in the individual content capture; identifying a subset of the plurality of text regions containing relevant text information; and determining a topic of the individual content capture based on a textual analysis of the subset of the plurality of text regions containing relevant text information; dividing the plurality of content captures into a plurality of collections of content captures, wherein an individual collection of the plurality of collections of content captures corresponds to an individual topic; generating a visual grouping for each individual collection of content captures identifying the corresponding individual topic; and displaying a rendering of the visual groupings within a graphical user interface of the desktop environment.

Example Clause B, the method of Example Clause A, wherein: the topic is a primary topic; and determining the topic comprises: determining a ranked list of plausible topics; and selecting a most likely topic from the ranked list as the primary topic.

Example Clause C, the method of Example Clause A, wherein: the individual content capture is assigned a plurality of topics; and the individual content capture is included in a corresponding plurality of collections of content captures.

Example Clause D, the method of any one of Example Clause A through C, wherein: the plurality of text regions included in the individual content capture is detected by a first machine learning model; and the subset of the plurality of text regions containing relevant text information is identified by a second machine learning model.

Example Clause E, the method of any one of Example Clause A through D, wherein the plurality of collections of content captures is ordered within the graphical user interface according to a user-configured preference.

Example Clause F, the method of any one of Example Clause A through D, wherein the plurality of collections of content captures are ordered within the graphical user interface based on a frequency of user access to each of the corresponding individual topics.

Example Clause G, the method of any one of Example Clause A through D, wherein the plurality of collections of content captures are ordered within the graphical user interface based on automatic suggestion based on a current user context.

Example Clause H, the method of any one of Example Clause A through G, wherein a collection of the plurality of collections of content captures is a user-defined collection.

Example Clause I, the method of any one of Example Clause A through H, wherein the graphical user interface further includes a user activity timeline comprising a plurality of segments corresponding to the plurality collections of content captures.

Example Clause J, the method of Example Clause I, further comprising: receiving a selection of an individual collection of content captures from the plurality of collections of content captures; and in response to receiving the selection of the individual collection of content captures, filtering the plurality of segments of the user activity timeline to represent the individual collection of content captures Example Clause K, a system for organizing a plurality of content captures into collections according to shared topics comprising: a processing system; and a computer-readable medium having encoded thereon computing-readable instructions that when executed by the processing system, cause the system to perform operations comprising: retrieving the plurality of content captures of a desktop environment, wherein an individual content capture includes a plurality of text regions defining a semantic context of the individual content capture; for each individual content capture of the plurality of content captures: detecting the plurality of text regions included in the individual content capture; identifying a subset of the plurality of text regions containing relevant text information; and determining a topic of the individual content capture based on a textual analysis of the subset of the plurality of text regions containing relevant text information; dividing the plurality of content captures into a plurality of collections of content captures, wherein an individual collection of the plurality of collections of content captures corresponds to an individual topic; generating a visual grouping for each individual collection of content captures identifying the corresponding individual topic; and displaying a rendering of the visual groupings within a content user interface of the desktop environment.

Example Clause L, the system of Example Clause K, wherein: the topic is a primary topic; and determining the topic comprises: determining a ranked list of plausible topics; and selecting a most likely topic from the ranked list as the primary topic.

Example Clause M, the system of Example Clause K, wherein: the individual content capture is assigned a plurality of topics; and the individual content capture is included in a corresponding plurality of collections of content captures.

Example Clause N, the system of any one of any one of Example Clause K through M, wherein: the plurality of text regions included in the individual content capture is detected by a first machine learning model; and the subset of the plurality of text regions containing relevant text information is identified by a second machine learning model.

Example Clause O, the system of any one of Example Clause K through N, wherein the graphical user interface further includes a user activity timeline comprising a plurality of segments corresponding to the plurality collections of content captures.

Example Clause P, the system of Example Clause O, the operations further comprising:

receiving a selection of an individual collection of content captures from the plurality of collections of content captures; and in response to receiving the selection of the individual collection of content captures, filtering the plurality of segments of the user activity timeline to represent the individual collection of content captures.

Example Clause Q, a computer-readable storage medium for organizing a plurality of content captures into collections according to shared topics, the computer-readable storage medium having encoded thereon computer-readable instructions that when executed by a system causes the system to perform operations comprising: retrieving the plurality of content captures of a desktop environment, wherein an individual content capture includes a plurality of text regions defining a semantic context of the individual content capture; for each individual content capture of the plurality of content captures: detecting the plurality of text regions included in the individual content capture; identifying a subset of the plurality of text regions containing relevant text information; and determining a topic of the individual content capture based on a textual analysis of the subset of the plurality of text regions containing relevant text information; dividing the plurality of content captures into a plurality of collections of content captures, wherein an individual collection of the plurality of collections of content captures corresponds to an individual topic; generating a visual grouping for each individual collection of content captures identifying the corresponding individual topic; and displaying a rendering of the visual groupings within a graphical user interface of the desktop environment.

Example Clause R, the computer-readable storage medium of Example Clause Q, wherein: the plurality of text regions included in the individual content capture is detected by a first machine learning model; and the subset of the plurality of text regions containing relevant text information is identified by a second machine learning model.

Example Clause S, the computer-readable storage medium of Example Clause Q or Example Clause R, wherein: the topic is a primary topic; and determining the topic comprises: determining a ranked list of plausible topics; and selecting a most likely topic from the ranked list as the primary topic.

Example Clause T, The computer-readable storage medium of Example Clause Q or Example Clause R, wherein: the individual content capture is assigned a plurality of topics; and the individual content capture is included in a corresponding plurality of collections of content captures.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for organizing a plurality of content captures into collections according to shared topics, the method comprising:

retrieving the plurality of content captures of a desktop environment, wherein:

the desktop environment comprises a graphical user interface that enables a user to interact with software applications installed on a computing device;

an individual content capture is associated with a user activity within the desktop environment at a given time; and the individual content capture includes a plurality of text regions defining a semantic context of the individual content capture;

for each content capture of the plurality of content captures:

detecting the plurality of text regions included in the content capture;

identifying a subset of the plurality of text regions containing the relevant text information; and determining a topic of the content capture based on a textual analysis of the subset of the plurality of text regions containing the relevant text information;

dividing the plurality of content captures into a plurality of collections of content captures, wherein an individual collection of content captures of the plurality of collections of content captures corresponds to an individual topic;

generating a visual grouping for each collection of content captures identifying the corresponding topic; and displaying a rendering of the visual groupings generated for the plurality of collections of content captures within the graphical user interface.

2. The method of claim 1, wherein:

the topic is a primary topic; and determining the primary topic comprises:

determining a ranked list of plausible topics; and selecting a most likely topic from the ranked list of plausible topics as the primary topic.

3. The method of claim 1, wherein:

the content capture is assigned a plurality of topics; and the content capture is included in a corresponding plurality of collections of content captures corresponds to the plurality of topics.

4. The method of claim 1, wherein:

the plurality of text regions included in the content capture is detected by a first machine learning model; and the subset of the plurality of text regions containing the relevant text information is identified by a second machine learning model.

5. The method of claim 1, wherein the visual groupings for the plurality of collections of content captures are ordered within the graphical user interface according to a user-configured preference.

6. The method of claim 1, wherein the visual groupings for the plurality of collections of content captures are ordered within the graphical user interface based on a frequency of user access to each of the corresponding individual topics.

7. The method of claim 1, wherein the visual groupings for the plurality of collections of content captures are ordered within the graphical user interface based on an automatic suggestion associated with a current user context.

8. The method of claim 1, wherein at least one collection of content captures of the plurality of collections of content captures is a user-defined collection of content captures.

9. The method of claim 1, wherein the graphical user interface further includes a user activity timeline comprising a plurality of segments corresponding to the plurality collections of content captures.

10. The method of claim 9, further comprising:

receiving a selection of a collection of content captures from the plurality of collections of content captures; and filtering the plurality of segments of the user activity timeline to represent the selection of the collection of content captures.

11. A system for organizing a plurality of content captures into collections according to shared topics, the system comprising:

a processing system; and a computer-readable medium having encoded thereon computing-readable instructions that when executed by the processing system, cause the system to perform operations comprising:

retrieving the plurality of content captures of a desktop environment, wherein:

the desktop environment comprises a graphical user interface that enables a user to interact with software applications installed on the system;

an individual content capture is associated with a user activity within the desktop environment at a given time; and the individual content capture includes a plurality of text regions defining a semantic context of the individual content capture;

for each content capture of the plurality of content captures:

detecting the plurality of text regions included in the content capture;

identifying a subset of the plurality of text regions containing relevant text information; and determining a topic of the content capture based on a textual analysis of the subset of the plurality of text regions containing the relevant text information;

dividing the plurality of content captures into a plurality of collections of content captures, wherein an individual collection of content captures of the plurality of collections of content captures corresponds to an individual topic;

generating a visual grouping for each collection of content captures identifying the corresponding topic; and displaying a rendering of the visual groupings generated for the plurality of collections of content captures within the graphical user interface.

12. The system of claim 11, wherein:

the topic is a primary topic; and determining the primary topic comprises:

determining a ranked list of plausible topics; and selecting a most likely topic from the ranked list of plausible topics as the primary topic.

13. The system of claim 11, wherein:

the content capture is assigned a plurality of topics; and the content capture is included in a corresponding plurality of collections of content captures corresponds to the plurality of topics.

14. The system of claim 11, wherein:

the plurality of text regions included in the content capture is detected by a first machine learning model; and the subset of the plurality of text regions containing the relevant text information is identified by a second machine learning model.

15. The system of claim 11, wherein the graphical user interface further includes a user activity timeline comprising a plurality of segments corresponding to the plurality collections of content captures.

16. The system of claim 15, the operations further comprising:

receiving a selection of a collection of content captures from the plurality of collections of content captures; and filtering the plurality of segments of the user activity timeline to represent the selection of the collection of content captures.

17. A computer-readable storage medium for organizing a plurality of content captures into collections according to shared topics, the computer-readable storage medium having encoded thereon computer-readable instructions that, when executed by a processing system, causes a system to perform operations comprising:

retrieving the plurality of content captures of a desktop environment, wherein;

the desktop environment comprises a graphical user interface that enables a user to interact with software applications installed on the system;

an individual content capture is associated with a user activity within the desktop environment at a given time; and the individual content capture includes a plurality of text regions defining a semantic context of the individual content capture;

for each content capture of the plurality of content captures:

detecting the plurality of text regions included in the content capture;

identifying a subset of the plurality of text regions containing relevant text information; and determining a topic of the content capture based on a textual analysis of the subset of the plurality of text regions containing the relevant text information;

dividing the plurality of content captures into a plurality of collections of content captures, wherein an individual collection of content captures of the plurality of collections of content captures corresponds to an individual topic;

generating a visual grouping for each collection of content captures identifying the corresponding topic; and displaying a rendering of the visual groupings generated for the plurality of collections of content captures within the graphical user interface.

18. The computer-readable storage medium of claim 17, wherein:

the plurality of text regions included in the content capture is detected by a first machine learning model; and the subset of the plurality of text regions containing the relevant text information is identified by a second machine learning model.

19. The computer-readable storage medium of claim 17, wherein:

the topic is a primary topic; and determining the primary topic comprises:

determining a ranked list of plausible topics; and selecting a most likely topic from the ranked list of plausible topics as the primary topic.

20. The computer-readable storage medium of claim 17, wherein:

the content capture is assigned a plurality of topics; and the content capture is included in a corresponding plurality of collections of content captures corresponds to the plurality of topics.

* * * * *